May 21, 1968     W. E. FOLKERTS     3,383,939
POWER STEERING GEAR
Filed Dec. 28, 1965     3 Sheets-Sheet 3
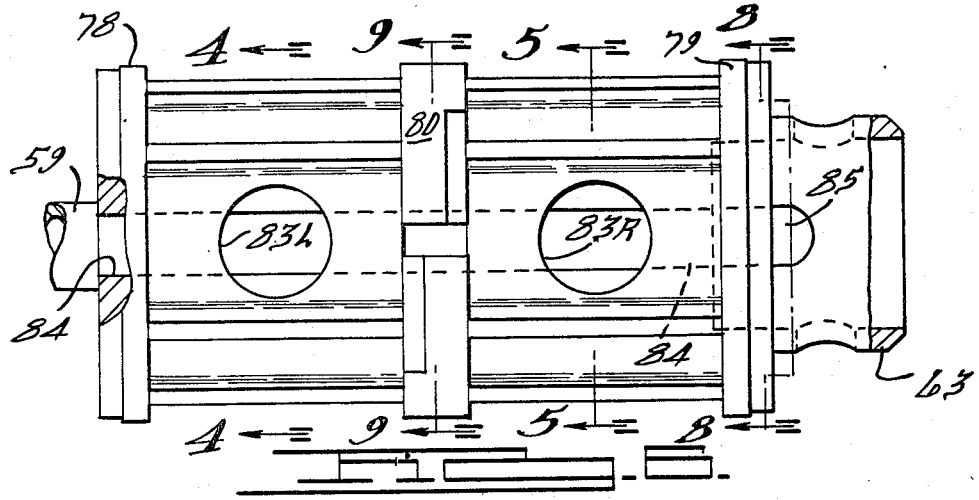
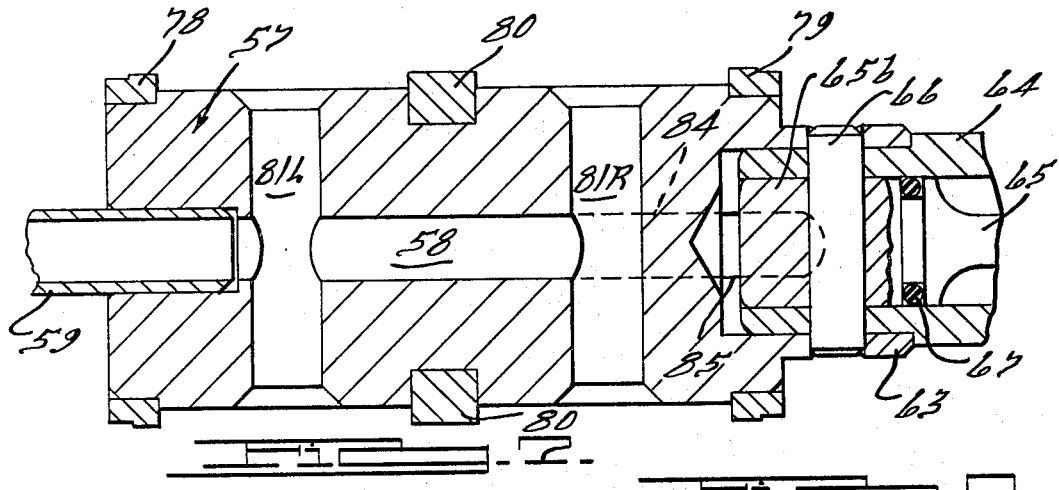
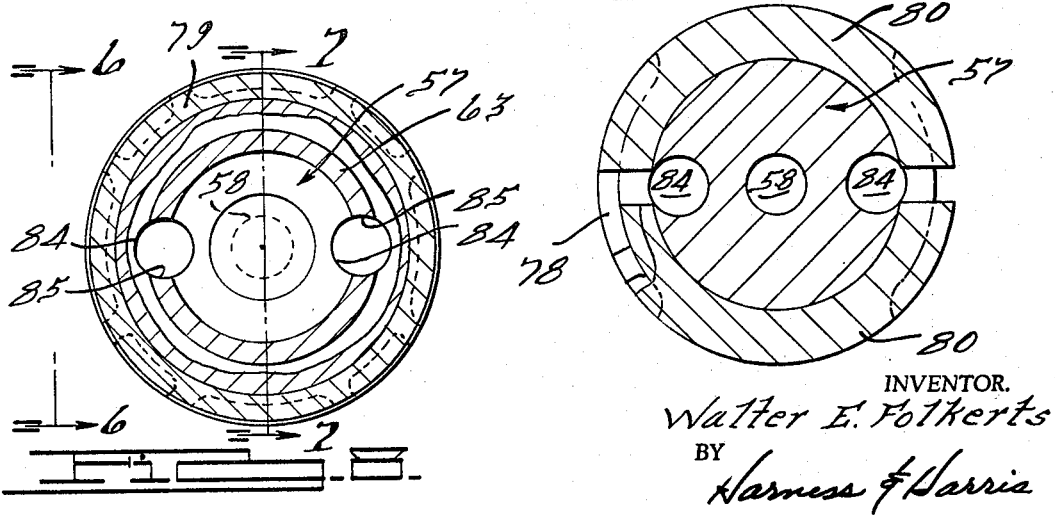
INVENTOR.
Walter E. Folkerts
BY
Harness & Harris
ATTORNEYS.

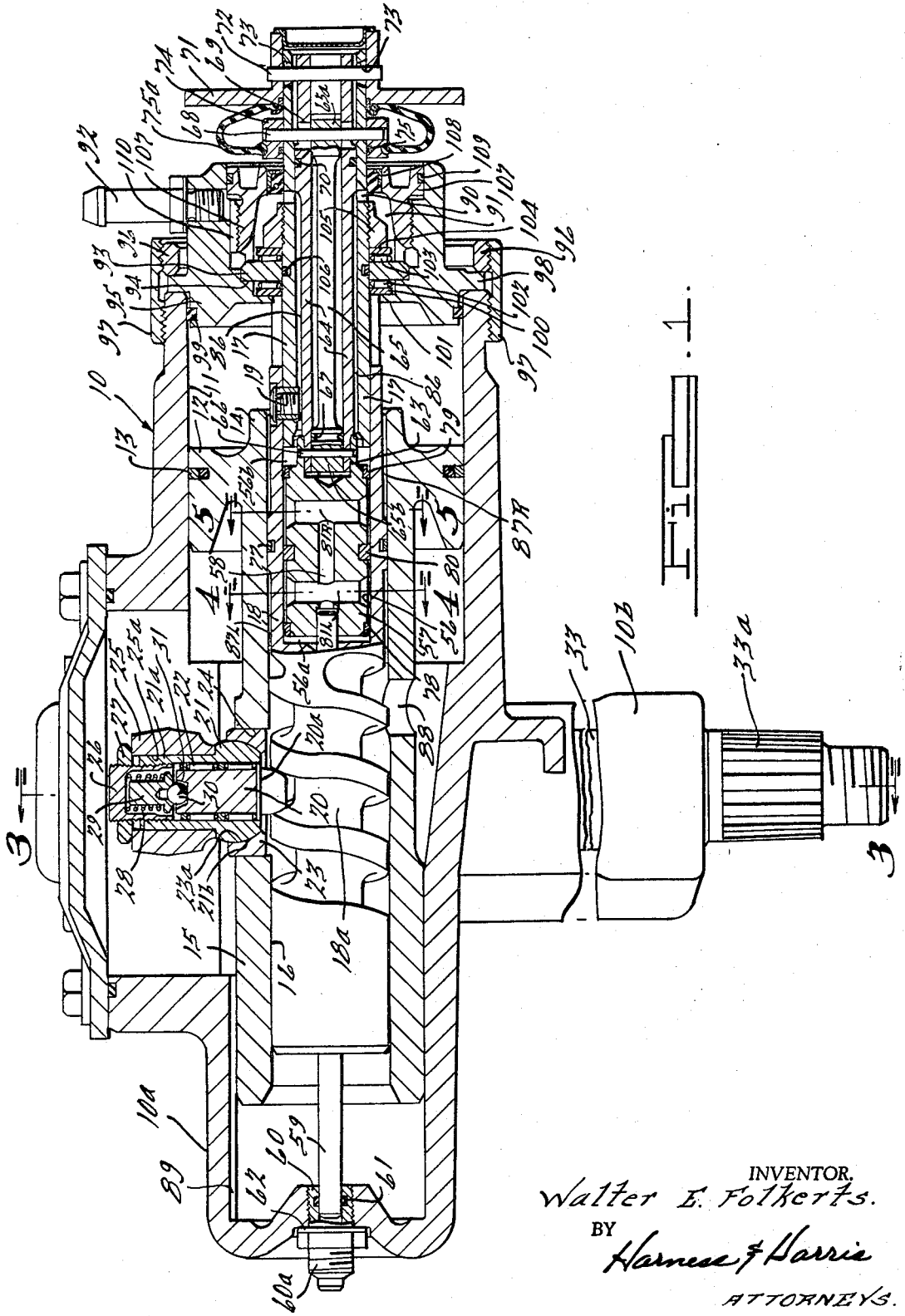

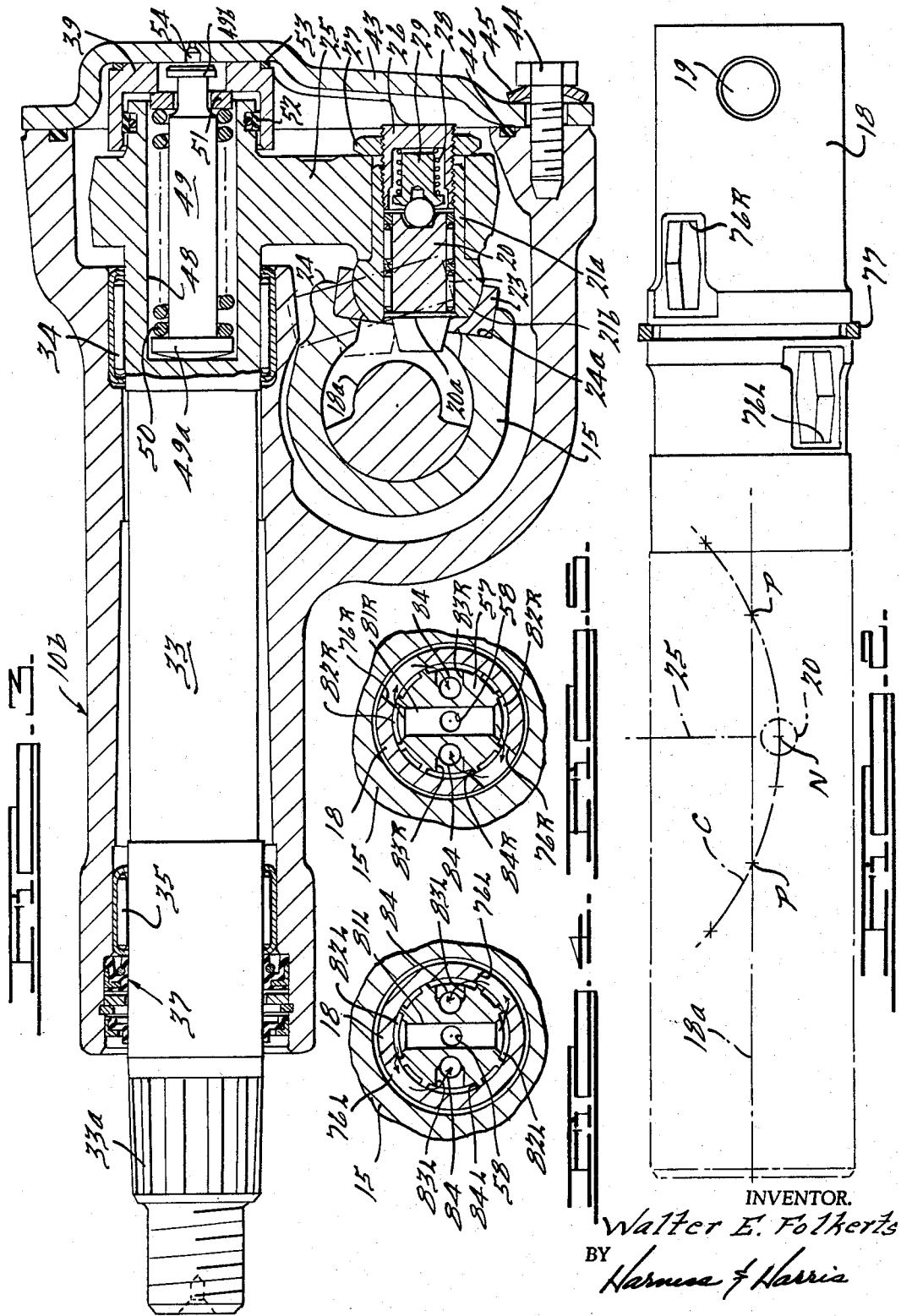

United States Patent Office 3,383,939
Patented May 21, 1968

3,383,939
POWER STEERING GEAR
Walter E. Folkerts, Hazel Park, Mich., assignor to Chrysler Corporation, Highland Park, Mich., a corporation of Delaware
Filed Dec. 28, 1965, Ser. No. 516,990
9 Claims. (Cl. 74—497)

ABSTRACT OF THE DISCLOSURE

A swinging arm coupled with an automobile steering linkage carries a ball element seated concentrically within a spherical socket element fixed with respect to a power actuated tubular support coaxial with a worm gear, such that the force urging seated relationship between the ball and socket elements is carried by the tubular support rather than worm gear, and the center of the resulting ball and socket coupling remains at a constant radius from the worm axis upon reciprocation of the tubular support along and about the worm axis during a steering operation. A worm follower extending through and supported by the ball element terminates in a nose movable along the worm groove and engaging the worm at a variable radial distance from the worm axis and at a constant distance from the center of the ball and socket coupling.

An object of the present invention is to provide a steering gear having an improved and simplified interconnection between the worm and crank arm, which is adapted for power assisted operation and which achieves a particularly efficient and responsive steering control for the vehicle.

Another and more specific object is to provide such a gear having a fluid pressure actuated piston reciprocable axially and rotatable within a cylindrical chamber in a housing for the gear, the worm extending coaxially through the piston and being journaled coaxially in a tubular extension of the piston which is supported in the housing for rotational and axial movement with the piston. The tubular extension comprises supporting means for the interconnection between the worm and crank arm.

The above mentioned interconnection comprises a follower pin having a nose which engages and follows the spiral groove of the worm and which extends through the center of a ball element carried by and fixed with respect to the swinging end of the crank arm. The ball element is adjustably seated within a mating spherical seat carried by and fixed with respect to the tubular extension of the piston to complete a ball-and-socket type universal coupling. The follower pin is mounted in the ball element for spring urged axial movement into its engagement with the worm and for rotation about its axis to minimize frictional contact with the worm. It is also supported with its axis constantly parallel to the pivot axis of the rock shaft, so that upon rotation and axial movement of the tubular extension (in consequence of swinging of the crank arm and follower pin carried thereby) the follower pin will pivot with respect to the tubular extension about the center of the ball and socket universal coupling.

In order to minimize the aforesaid spring urged axial movement of the follower pin during operation, the worm is dimensioned so that its point of contact with the nose of the follower pin will remain at a constant distance from the center of the ball and socket universal coupling. Accordingly, as the follower pin moves along the worm spiral, the follower pin will not move axially with respect to the center of the universal coupling, nor of the ball element within which it is supported, so that the spring means employed to urge such axial movement will be required only to accommodate unavoidable dimensional variations resulting from production tolerences. In consequence, the latter spring means can feasibly have a high spring rate and a comparatively short dimension axially of the follower pin. These considerations are important because the space available for such a spring in the gear housing is slight and small movements of the follower pin along its axis relative to the ball element would result in appreciable changes in the force of the spring urged contact between the follower and the worm, with consequent undersirable variations in the steering feel and returnability of the gear to its neutral or straight ahead steering position.

Movement of the ball element, follower pin, and crank arm in the direction of the axis of the rock shaft upon rotation of the tubular extension is accommodated by axial movement of the rock shaft itself under the influence of a rock shaft spring which yieldingly urges the rock shaft axially in the direction to maintain the ball element seated in the mating socket carried by the tubular extension, which thereby carries the force of the rock shaft spring and insulates the latter force from direct interference with the steering action. Also, there is adequate space in the housing for the rock shaft spring, so that the axial dimension of the same may feasibly be sufficient to enable the axial operational movement of the rock shaft without appreciably changing the spring force acting thereon. As a result, an exceptionally responsive steering gear is achieved from which play or lost motion and consequent "drift" of the vehicle during straight ahead steering are virtually eliminated.

Another object is to provide such a gear wherein the axis of the follower pin at the neutral or straight ahead steering position lies at one side of a plane along the axis of the worm and parallel to the axis of the follower pin and passes through this plane upon swinging of the crank arm and follower pin in either direction from the straight ahead position toward the limits of steering movement. This construction, in combination with the axis of the follower pin maintained parallel to the rock shaft axis throughout the steering movement, results in the major extent of the steering movement of the follower pin being generally along and in proximity to the aforesaid axial plane of the worm and renders feasible the use of a worm having a constant outer diameter regardless of the aforesaid variation in the radial distance from the worm axis to the point of contact between the worm and follower pin.

Another object is to provide such a gear which is particularly compact, efficient in operation, economical to manufacture, and characterized by fewer parts and external leak points than comparable gears.

Other objects of this invention will appear in the following description and appended claims, reference being had to the accompanying drawings forming a part of this specification wherein like reference characters designate corresponding parts in the several views.

FIGURE 1 is a cross sectional view of a steering gear embodying the present invention, taken generally along the axis of the driven shaft and worm gear and showing the rotary valve in the neutral position.

FIGURE 2 is an enlarged and partially schematic plan view of the integral worm and valve portion, looking along the axis of the rock shaft.

FIGURE 3 is a sectional view along the axis of the rock shaft, taken in the direction of the arrows substantially along the line 3—3 of FIGURE 1.

FIGURE 4 is a transverse sectional view through the valve, taken in the direction of the arrows substantially along the line 4—4 of FIGURE 6.

FIGURE 5 is a transverse sectional view through the valve, taken in the direction of the arrows substantially along the line 5—5 of FIGURE 6.

FIGURE 6 is an enlarged side elevational view of the valve as seen in FIGURE 1, taken in the direction of the arrows substantially along the line 6—6 of FIGURE 8.

FIGURE 7 is a longitudinal sectional view through the valve as seen in FIGURE 1 and taken in the direction of the arrows substantially along the line 7—7 of FIGURE 8.

FIGURE 8 is a transverse sectional view through the valve, taken in the direction of the arrows substantially along the broken line 8—8 of FIGURE 6.

FIGURE 9 is a transverse sectional view through the valve, taken in the direction of the arrows substantially along the line 9—9 of FIGURE 6.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in a hydraulically actuated steering gear for an automobile comprising a housing 10 having a cylindrical bore 11 in which a fluid pressure actuated piston 12 is reciprocable. An annular seal 13 around the periphery of the piston 12 cooperates with the latter to partition the bore 11 into left and right parts. The piston 12 is provided with integral tubular coaxial guide extensions 14 and 15 extending to the right and left respectively and cooperating to effect a bore 16 extending axially through the entire piston structure. The left extension 15 slides axially in guided relation within a cylindrical extension 10a of the housing 10.

A two part tubular driven shaft is rotatably supported within the bore 16 and comprises an outer shaft 18 and a coaxial inner shaft 17 snugly interfitting to complete a fluid tight seal therebetween and securely keyed together by a pin 19 for rotation as a unit. The left end of shaft 18 comprises an integral worm gear 18a which may have a variable or constant pitch and which is engaged by a rotatable follower pin 20 having a tapered nose adapted to ride long the spiral groove of the worm 18a upon rotation of the latter. The follower 20 is journaled in a ball element 21 by means of needle bearings 22 which seat against an annular flange 20a of the follower 20 immediately above the latter's nose. The ball element 21 has a stem 21a coaxial with the axis of rotation of the pin 20, and an integral spherical ball portion 21b seated in a mating spherical socket 23a of an annular socket element 23. The latter is carried by and fixed with respect to the extension 15 by being pressed tightly into an annular embossment 24, FIGURE 3, against a shoulder 24a integral with shaft extension 15. The follower 20 extends through the center of ball 21b and, when at a particular steering position described below, coaxially thru the annular socket 23 and radially toward the axis of rotation of worm 18a.

The stem 21a extends tightly into a bore 25a in the swinging end of a crank arm 25 which is secured firmly against the enlargement of ball 21b by means of a nut 27 screwed tightly on a hollow cap screw 26 and against arm 25. The screw 26 screws into the internally threaded outer end of stem 21a and provides a seat for a coil spring 28 compressed axially of the follower 20 against an annular shoulder of a pilot 29. The inner end of the pilot 29 provides a spherical socket for an anti-friction ball 30, which in turn seats within an outwardly opening depression 31 in the outer end of follower 20, whereby the latter is urged in the direction of its axis into engagement with the groove of worm 18a. The needle bearings 22 are retained in an annular bearing race confined between the lower or inner end of cap screw 26 and the enlargement 20a.

The swinging arm 25 extends offset from and perpendicularly from the axis of the worm 18a to the rock shaft 33 when the steering mechanism is in the straight ahead steering position illustrated in FIGURE 1 and is preferably formed integrally with the rock shaft 33. The latter is pivotal about an axis transverse to the axis of the worm and is journaled in a housing extension 10b by means of needle bearings 34 and 35. The left end of rock shaft 33 comprises a tapered spline 33a adapted to be connected with the customary linkage for steering the vehicle ground engaging wheels. A suitable seal assembly 37 prevents axial endwise leakage of lubricating fluid from the housing 10b.

The right end of rock shaft 33 is axially slidable within an annular socket member 39 seated against a closure plate 43 for the right end of housing 10b and secured thereto by a plurality of bolts 44 and spring lock washers 45. An endwise opening bore 48 in the right end of rock shaft 33 contains a pilot 49 for a coil spring 50 seated under compression against an integral head 49a of the pilot 49 and a horseshoe shaped washer 51 which is provided to facilitate preassembly of the spring 50. Thus the latter is compressed on pilot 49 between head 49a and washer 51, whereby the latter is resiliently urged against an integral annular enlargement 49b of the pilot 49. This assembly is then inserted into bore 48, whereupon socket member 39 is assembled and closure 43 is screwed into place by tightening bolts 44 to urge washer 51 to the position shown in FIGURE 3. An air breather opening 54 is provided in closure 43 to facilitate limited axial shifting of rock shaft 33 against the force of spring 50 during operation, as described below. A suitable annular seal 46 is provided between closure 43 and housing 10b to prevent leakage from the latter, and annular seals 52 and 53 are provided respectively between shaft 33 and the interior of socket 39 and between socket 39 and closure 43 to prevent leakage of pressurized fluid from the interior of housing 10b into the region of pilot 49 and bleed opening 54.

As is apparent from FIGURES 2 and 3, the follower 20 at the neutral or straight ahead steering position lies at one side of the axial plane of worm 18a which is also parallel to the axes of shaft 33 and follower 20, and crosses this plane at P as the follower 20 swings about the axis of shaft 33 and moves in either direction from the neutral position N toward the limit of steering movement. The point of contact between follower 20 and worm 18a follows the curve C in FIGURE 2 and rises with the curvature of the worm 18a as the follower 20 moves from N to P, then falls as follower 20 continues to move toward the limit of steering movement.

In order to prevent axial movement of follower 20 with respect to crank arm 25, the cam contour of the worm 18a is dimensioned so that the distance from the point of contact between follower 20 and worm 18a to the center of ball element 21b is constant at any point along curve C. The center of ball element 21b will swing around the axis of worm 18a at a constant radius upon rotation of sleeve 15 coaxially around worm 18a during operation. Hence the axis of follower 20 will remain parallel to the axis of shaft 33 throughout the steering movement and all parts of the follower 20 will remain fixed with respect to the center of the ball element 21b, which is also the center of pivotal movement enabled by the ball and socket coupling comprising the ball element 21b seated on the spherical surface 23a of socket 23. No relative axial movement of follower 20 with respect to crank arm 25 will take place and the tension of spring 28 urging follower 20 against worm 18a will remain unchanged, resulting in a uniform steering feel and returnability throughout the steering movement. As the center of the ball element 21b moves around the axis of worm 18a in a path of constant radius, the resulting slight axial movement of follower 20 with respect to the axis of worm 18a will be accommodated by axial movement of shaft 33 against the tension of spring 50. The axial length of spring 50 is comparatively long with respect to the change in axial compression it experiences, so that the force of spring 50 urging ball element 21b into seated engagement with socket 23 will remain substantially constant throughout the steering movement.

Rightward of the worm 18a, FIGURE 1, the bore of the integral tubular shaft 18 enlarges at 56 to provide coaxial enclosure for a hollow cylindrical valve spool 57 having an inner chamber 58 closed at its right end and opening leftwardly to communicate with a source of pressurized fluid by means of a supply conduit 59 which extends axially through the worm 18a and into the left end of the valve spool 57. The conduit 59 passes freely through the bore of the worm 18a so as to rotate independently thereof and is pressed tightly into fluid sealing engagement into the left end of valve spool 57 to rotate as a unit therewith. The left end of conduit 59 extends rotatably into the right end of a tubular fitting 60 screwed into the housing extension 10a and adapted externally at 60a for connection with a source of pressurized fluid, as for example the outlet of a power steering pump. Annular seals 61 and 62 around the conduit 59 and fitting 60 prevent axial endwise leakage of pressurized fluid from the housing extension 10a.

The right end of chamber 58 is closed by an integral end portion of spool 57 which in turn has a rightwardly opening socket portion 63 of reduced external diameter connected by means of a diametric pin 66, FIGURE 7, to the left end of a tubular valve actuator or driving shaft 64 and the enlarged left end 65b of a coaxial inner torsion rod 65 for rotation as a unit therewith. A suitable annular seal 67 around the enlargement 65b prevents axial leakage of hydraulic fluid from the bore of shaft 17 and return conduits 84 described below into the bore of the tubular driving shaft 64.

The torsion rod 65 extends coaxially within the valve actuator or driving shaft 64 and terminates in an enlarged end 65b keyed to the outer driven shaft 17 by means of a pin 68. The latter extends through diametrically spaced and circumferentially extending lost motion slots 69 in the driving shaft 64, which allow approximately 8° of rotation of the driving shaft 64 in either direction from a neutral straight ahead steering position before the driving shaft 64 engages the pin 68. A suitable annular seal 70 around the driving shaft 64 prevents axial end-wise leakage of hydraulic fluid between the latter and shaft 17.

The driving shaft 64 is operably connected to the customary manually actuated steering wheel of the automobile by means of a steering shaft and universal coupling including a hub member 71 and diametrical pin 72 as part thereof. The latter extends through hub 71 and the right end of driving shaft 64 to key these together for rotation as a unit. Similarly to the lost motion slots 69, diametrically spaced lost motion slots 73 are provided in the right end of driven shaft 17 for passage of the pin 72, so that upon rotation of the latter about the common axis of the shafts 17 and 64, the shaft 64 will rotate approximately 8° from the neutral position before the pin 72 engages the driven shaft 17. Thus the pin 72 comprises the main manual driving connection between the automobile steering wheel and driven shaft 17 in the event of hydraulic power failure. The opposite ends of pin 68 extend radially through a valve adjustment ring 74. The latter is covered by a flexible dirt shield 75a clamped to shaft 17 by hub 71 and cooperable with an annular seal 75 between shaft 17 and ring 74 to shield the adjustment mechanism of ring 74 from dirt.

In operation of the device described thus far, upon rotation of the manual steering wheel so as to rotate pin 72 and in turn rotate shaft 64 about its longitudinal axis, the rotation of shaft 64 will be imparted directly to the valve spool 57 to rotate the latter and thereby to direct pressurized fluid either to the left or right side of piston 12 as described below so as to reciprocate the piston 12 and thereby rotate worm 18a and rock shaft 33 in the direction to effect the desired turn. Rotation of the driving shaft 64 will be yieldingly resisted by the torsion rod 65 connected at its right end to the driven shaft 17 by pin 68. This resistance will be determined by the road reaction on the dirigible wheels of the vehicle which resists turning of the rock shaft 33 and thereby resists rotation of worm 18a and shaft 17. In the event of hydraulic power failure, torsion rod 65 will either cause rotation of the driven shaft 17 directly if the road reaction is comparatively light, as for example during high speed driving, or the left end of torsion rod 65 will rotate with driving shaft 64 approximately 8° with respect to the driven shaft 17, in which event pin 72 will engage driven shaft 17 to rotate the latter and worm 18a to effect manual steering.

In order to effect hydraulic power steering, the shaft 18 is provided with two pairs of axially spaced work ports or openings 76L and 76R at the region of the valve spool 57 and spaced by an annular seal 77 between the circumference of shaft 18 and the interior of sleeve 15 to cooperate with piston 12 in partitioning the cylinder 11 into the aforesaid left and right parts. An annular sealing land 78 is provided around the periphery of valve 57 adjacent its left edge in FIGURE 1 to engage the interior of bore 56 and prevent leakage of pressurized fluid into the valve porting system described below. Similar lands 79 and 80 are provided at the right edge and center respectively, of valve 57, the land 80 spacing the ports 76L and 76R and being formed in two halves, FIGURE 9, to facilitate assembly on the valve 57, whereas the lands 78 and 79 are annular and are pressed onto the ends of valve 57.

Communicating with the chamber 58 and extending diametrically through the circumferential sidewall of the valve 57 at the regions of the work openings 76L and 76R respectively are two axially spaced supply ports 81L and 81R, which terminate in radially outwardly opening enlargements 82L and 82R, respectively, FIGURES 4 and 5. Associated respectively with the supply ports 81L and 81R are a pair of return ports 83L and 83R extending radially into the outer surface of the inner valve member 57 at locations spaced 90° circumferentially from the associated supply ports. The return ports 83L and 83R open radially outwardly at enlargements 84L and 84R respectively, FIGURES 4 and 5, and communicate with a pair of axially extending return conduits 84 in the inner valve 57, which open axially into the space 56a between the left end of valve 57 and the shoulder at the base of the bore enlargement 56 to drain fluid therefrom, and also open at the right end of valve 57 through a corresponding pair of radially opening ports 85, FIGURE 7, defined by the axial extension of the conduits 84 partially into the reduced diameter socket 63. The ports 85 open into the space 56b within bore enlargement 56 at the right end of valve 57, which space communicates with an annular fluid return conduit 86 comprising the space between valve driving shaft 64 and driven shaft 17.

Each of the work ports 76L is associated with one of each of the supply ports 81L and return ports 83L and is arranged between these associated ports when the valve is at its neutral position shown, FIGURES 4 and 5. Similarly each of the work ports 76R is associated with one of each of the supply ports 81R and return ports 83R and is arranged between these associated ports when the valve is at the neutral position. Also when the valve spool 57 is in the neutral position illustrated in FIGURES 4 and 5, each work port 76 (L or R) is in partial communication with both its associated supply port 81 (L or R) and return port 83 (L or R), so that pressurized fluid entering the chamber 58 from conduit 59 will be discharged through the supply ports 81L and 81R into the associated work ports 76L and 76R and thence into the associated return ports 83L and 83R to the axial return ducts 85.

The work ports 76L and 76R are offset approximately

90° from each other so that rotation of the valve member 57 counterclockwise in FIGURES 4 and 5 will close the communication between the supply ports 81R and work ports 76R, and open the communication between the work ports 76R and return ports 83R. Similarly the communication between supply ports 81L and work ports 76L will be increased and the communication between work ports 76L and return ports 83L will be closed. Pressurized fluid will thus be discharged through work ports 76L into the annular flow passage 87L at the left of seal 77 between supporting sleeve 15 and shaft 18, and thence along worm 18a and through port 88 in sleeve 15 to the left side of piston 12 in cylinder 11 to drive the same from left to right, rotate worm 18a counterclockwise as viewed from the right in FIGURE 1, and swing follower 20, crank arm 25 and rock shaft 33 to effect a left turn for the vehicle. Pressurized fluid at the right side of the piston 12 will be returned as described below to the work openings 76R and discharged via return ports 83R to return conduits 84.

It is apparent from the foregoing that upon clockwise rotation of valve member 57 with respect to worm shaft 18 in FIGURES 4 and 5, the pressurized fluid will be supplied through ports 81R to openings 76R and thence to annular conduit 87R at the right of seal 77 between sleeve 15 and shaft 18 and to the right side of piston 12 in cylinder 11 to drive piston from right to left and effect a righthand turn for the vehicle. In this event, the return fluid will be discharged from the left side of piston 12 into work opening 76L and thence through ports 83L to return ducts 84 via port 88 and conduit 87L. The return flow from the right side of piston 12 when the left side of the latter is pressurized will be the reverse of the flow path described above to pressurize the right side of piston 12. Fluid from within the main body of housing 10 is also conducted freely to the left end of housing portion 10a by means of conduit 89 to prevent any dash-pot action.

The annular return conduit 86 extends axially within the bore of shaft 17 to a plurality of radial ports 90 in the latter. The ports 90 communicate radially outwardly of the shaft 17 with an annular space or chamber 91 around shaft 17 and thence with a return connection 92 adapted to be connected with a reservoir or with the inlet side of the power steering pump.

The driven shaft assembly 17, 18 is held in axial position with respect to the housing 10 by means of an annular stop or bearing race 93 abutting an annular shoulder 94 of an end closure 95 for cylinder 11 and secured in position by a nut 96 screwed into the right end of a sleeve nut 97 against a radial flange 98 integral with closure 95 and seated against the right end of housing 10, FIGURE 1. The sleeve 97 is also screwed on an externally threaded portion of housing 10 and cooperates with nut 96 in mutually interlocking relation. A suitable annular seal 99 around closure 95 prevents loss of fluid axially from cylinder 11. An annular needle bearing race 100 coaxially around shaft 17 abuts a radial shoulder 101 of closure 95 and is spaced from race 93 by a needle bearing set 102. A similar annular needle bearing set 103 around the shaft 17 spaces the race 93 from a third annular bearing race 104 maintained in axial position by a nut 105 screwed on an externally threaded portion of shaft 17 near its right end. An annular seal 106 around shaft 17 at the inner periphery of the race 93 prevents axial endwise leakage from cylinder 11 along shaft 17. In this regard the outer periphery of race 93 seats in fluid sealing engagement against a mating annular wall of closure 95 to complete the seal for the right end of cylinder 11. The space 91 at the right of the ports 90 is closed by a nut 107 which screws into the annular opening of closure 95 around shaft 17 and carries inner and outer annular seals 108 and 109 in sealing engagement with the outer periphery of shaft 17 and inner periphery of closure 95. An axial groove 110 in the inner periphery of closure 95 at the region of nut 107 provides communication between chamber 91 and the return connection 92.

I claim:

1. In a vehicle steering gear, a rotatable worm, follower means engaging said worm for guided movement therealong, supporting means for said follower means and mounted for movement axially of and rotatably about the axis of said worm, a universal coupling connecting said supporting means and follower means for universal pivotal movement therebetween, swinging means pivotal about an axis transverse to the axis of said worm and having a swinging end, means connecting said swinging end with said follower means to effect said guided movement thereof upon rotation of said worm, said universal coupling having a center of pivotal movement for said follower means with respect to said supporting means at a constant radial distance from the axis of said worm, and cooperating portions on said follower means and worm for maintaining a fixed distance from said center of pivotal movement to the point of contact between said follower means and worm upon movement of said follower and supporting means with respect to said worm.

2. In a vehicle steering gear according to claim 1, said universal coupling being carried by said supporting means and said cooperating portions for maintaining said fixed distance from said center of pivotal movement to the point of contact between said follower means and worm comprising a variable radius provided by said worm to said point of contact increasing in either direction along said worm from said central position to a maximum, then decreasing toward said limits of steering movement.

3. In a vehicle steering gear according to claim 2, said supporting means including a sleeve coaxially enclosing said worm and journaled thereon for axial movement along and rotation about the axis of said worm, manually movable means having a limited lost motion coupling with said worm for rotating the latter, and power actuated means responsive to limited lost motion of said manually movable means relative to said worm for moving said supporting means axially of said worm.

4. In a steering gear, a rotatable worm, follower means engaging said worm for guided movement therealong, means for supporting said follower means in a predetermined direction of alignment with a line parallel to an axis transverse to the axis of rotation of said worm and for rotating said follower means about said axis of rotation concurrently with said movement along said worm, and cooperating portions on said worm and follower means for maintaining the projection on said line of the point of engagement between said follower means and worm at a fixed distance greater than zero measured in said direction from a cylindrical surface coaxial with said axis of rotation.

5. In a steering gear according to claim 4, said follower means having a predetermined point lying on said cylindrical surface, and said means for supporting and rotating said follower means also including means for rotating said predetermined point about said axis of rotation at the radius of said cylindrical surface.

6. In a steering gear according to claim 5, said means for supporting and rotating said follower means including a support mounted for movement axially of and rotatably about the axis of said worm, a socket element fixed with respect to said support and having an interior spherical surface, and ball means centered on said line and cooperating with said follower in supporting relationship, said ball means having an exterior spherical surface adjustably seated concentrically in said interior spherical surface for universal pivotal movement therein.

7. In a vehicle steering gear, a rotatable worm, follower means engaging said worm for guided movement therealong, supporting means for said follower means and mounted for movement axially of and rotatably about the axis of said worm, a universal coupling connecting said supporting means and follower means for universal pivotal movement therebetween, swinging means pivotal about an axis transverse to the axis of said worm and having a swinging end, means connecting said swinging end with said follower means to effect said guided movement thereof upon rotation of said worm, a housing, said supporting means comprising an axially reciprocable tubular shaft journaled in said housing and having said worm journaled coaxially therein, said universal coupling including a socket element fixed with respect to said tubular shaft and having an interior spherical surface, a ball element secured to the swinging end of said swinging means and having an exterior spherical surface adjustably seated concentrically in said interior spherical surface for pivoting about the center thereof, said follower means including a pin extending diametrically through said ball element and terminating in a nose engaging said worm.

8. In a vehicle steering gear according to claim 7, means yieldingly urging said swinging means in the direction parallel to its axis of pivotal movement for holding said ball element seated in said socket element.

9. In a vehicle steering gear according to claim 8, means yieldingly urging said nose endwise of said pin into engagement with said worm, said housing having a cylinder coaxial with said worm and tubular shaft, a fluid pressure actuated piston reciprocable in said cylinder and secured to said tubular shaft to reciprocate the latter, said worm extending coaxially through said piston, and cooperating portions on said nose and worm for maintaining a fixed distance measured along a line in the direction parallel to the axis of said swinging means from the center of said ball element to the projection on said line of the point of contact between said nose and worm.

References Cited
UNITED STATES PATENTS 1,120,096 12/1914 Sizaire _____ 74—497
3,033,051 5/1962 Reinke et al. _____ 74—388

FOREIGN PATENTS 913,303 12/1962 Great Britain.

MILTON KAUFMAN, *Primary Examiner.*